(12) United States Patent
Neidigh (10) Patent No.: US 6,231,226 B1
(45) Date of Patent: May 15, 2001

(54) MIXING PITCHER

(75) Inventor: Brian Neidigh, Sandwich, IL (US)

(73) Assignee: The Pampered Chef, Ltd., Addison, IL (US)

( * ) Notice: Subject to any disclaimer, the term of this patent is extended or adjusted under 35 U.S.C. 154(b) by 0 days.

(21) Appl. No.: 09/515,353

(22) Filed: Feb. 29, 2000

(51) Int. Cl.[7] .................................................. B01F 11/00
(52) U.S. Cl. ................................... 366/256; 366/332
(58) Field of Search ........................... 366/130, 255–260, 366/332–335

(56) References Cited

U.S. PATENT DOCUMENTS

| | | | |
|---|---|---|---|
| 203,081 | * | 4/1878 | Silver . |
| D. 220,773 | | 5/1971 | Dilyard ................................ D7/317 |
| D. 264,926 | | 6/1982 | McClelland ........................ D7/318 |
| D. 270,602 | | 9/1983 | Fritz .................................... D7/319 |
| D. 304,799 | | 11/1989 | Freese ................................ D7/319 |
| D. 331,446 | | 12/1992 | Gidman ......................... D7/317 X |
| D. 338,367 | | 8/1993 | Fonville ............................. D7/317 |
| D. 344,428 | | 2/1994 | Ancona et al. .................... D7/316 |
| D. 356,004 | | 3/1995 | VanValkenburg et al. ....... D7/318 X |
| D. 372,627 | | 8/1996 | Ireland ............................... D7/319 |
| D. 384,237 | | 9/1997 | Hess ................................... D7/319 |
| 722,833 | * | 3/1903 | Furlong . |
| 1,174,828 | * | 3/1916 | Copeland . |
| 1,948,431 | * | 2/1934 | Rolph . |
| 2,266,186 | * | 12/1941 | Fischer . |
| 2,291,708 | * | 8/1942 | Gluck . |
| 2,726,071 | * | 12/1955 | Bernhardt . |
| 3,137,228 | * | 6/1964 | Elow . |
| 3,844,450 | | 10/1974 | Johnson . |
| 4,010,934 | * | 3/1977 | McCord et al. . |
| 4,460,279 | * | 7/1984 | Krasney ............................. 366/247 |
| 4,946,286 | * | 8/1990 | Purkapile ........................... 366/247 |
| 5,284,389 | * | 2/1994 | Lumsden ............................ 366/256 |
| 5,388,729 | | 2/1995 | Gerringer . |
| 5,533,802 | * | 7/1996 | Garganese ......................... 366/256 |
| 5,580,169 | * | 12/1996 | Ghindini ............................ 366/333 |
| 5,695,282 | * | 12/1997 | Hess ................................... 366/332 |
| 5,780,087 | * | 7/1998 | Brady . |

FOREIGN PATENT DOCUMENTS

| | | | |
|---|---|---|---|
| 833902 | * | 11/1938 | (FR) .................................. 366/332 |
| 1025543 | * | 4/1953 | (FR) .................................. 366/366 |
| 68126 | | 6/1951 | (NL) . |

OTHER PUBLICATIONS

Rubbermaid Measuring Pitcher (top), Restaurant and Institutions Feb. 1981, p. 197 (D10/46.2).
Pitcher (bottom right) # 3062–87, Rubbermaid 1991.
Pitcher #3326, Rubbermaid 1992, p. 16.

* cited by examiner

Primary Examiner—Charles E. Cooley
(74) Attorney, Agent, or Firm—Olson & Hierl, Ltd.

(57) ABSTRACT

A combination pitcher and mixing subassembly is described that incorporates a mixing head which is longitudinally reciprocally movable within the pitcher. The combination is particularly well suited for use with pitchers that are not cross-sectionally circular, such as pitchers that are elliptical or that have parallel; elongated side walls with semi-circular ends. The mixing head has a peripheral region which generally conforms to the internal bottom configuration of the pitcher. The mixing head has a plurality of straight, elongated vanes that extend across the mixing head in parallel, spaced, diagonal relationship to each other with the vanes on one side of the mixing head shaft being inclined at an opposite angle relative to those on the other side of the shaft. Preferably, the mixing head also has a plurality of vertically oriented, spaced, parallel baffle plates that extend across the mixing head perpendicularly relative to the vanes and that join the vanes at all locations of cross-over.

31 Claims, 7 Drawing Sheets

MIXING PITCHER

FIELD OF THE INVENTION

This invention relates to a pitcher equipped with a cooperating manually operated mixing subassembly.

BACKGROUND OF THE INVENTION

Pitchers adapted for dispensing beverages and the like that are associated with mixing subassemblies, particularly a cooperating mixing subassembly having a mixing head that is manually reciprocated vertically while the pitcher is an upright orientation, are well known. Commonly, such a pitcher has a cross-sectionally circular configuration. Moreover, the associated mixing subassembly has a mixing head mounted on the lower end of a shaft which projects upwards, which slidably and centrally extends through a pitcher mouth cover member, and which terminates in a hand-graspable handle portion. When the shaft is manually reciprocated, the mixing head produces agitation and mixing of fluid in the pitcher.

Because of the volumetric space occupied by an upright pitcher, a storage problem arises particularly when the liquid-holding capacity of a cross-sectionally circular pitcher is increased from, for example, a one quart, or one liter, size to a four quart (gallon), or four or five liter, size. The problem is particularly troublesome when the large-sized pitcher is stored, even temporarily, in a refrigerator before the resulting chilled liquid contents of the pitcher, after a final mixing, are dispensed. A cross-sectionally round pitcher of a gallon size capacity can occupy so much space that it is not suitable for practical storage on the top shelf or in the door of a domestic refrigerator.

To alleviate the pitcher size and space-consuming problem, it is proposed to reconfigure a pitcher from a cross-sectionally circular configuration to a cross-sectionally elliptical configuration, or, generically, to a so-called race-track configuration. The term "cross-sectional race-track configuration" (or equivalent word form) is used herein as a convenience to designate a pitcher configuration characterized by having (a) spaced, opposed, symmetrical, curved, or, alternatively, flattened side walls (the latter now preferred), with (b) interconnecting symmetrical, opposed, semi-circular end walls. However, such a configuration causes a new problem to arise—the mixing head of common prior art mixing subassembly is configured for use in a cross-sectionally circular pitcher, and is not suitable, or sufficiently effective, for use in the reconfigured pitcher. Even assuming that suitable means for mounting the prior art mixing subassembly through the lid of the reconfigured pitcher is found, the mixing capacity or mixing efficiency of the prior art mixing subassembly is generally insufficient or inadequate for acceptable marketing purposes even for domestic utilization.

Thus, a need arises for an improved combination of pitcher and cooperating mixing subassembly, particularly a combination wherein the pitcher has a space-saving non-circular cross-sectional configuration, and wherein the mixing head of the mixing assembly is adapted for producing mixing of the liquid contents of the pitcher in a highly efficient and effective manner. The present invention satisfies this need.

SUMMARY OF THE INVENTION

This invention provides a new and improved combination of beverage pitcher and coacting, manually-operated, reciprocatable mixing subassembly. The combination is particularly well adapted for use with pitchers that are characterized by having a non-circular cross-sectional configuration, particularly pitchers having in cross-section a race-track configuration.

The inventive combination enables one to accomplish a mixing of the liquid contents of a pitcher in a minimum of time and with a minimum of effort but with maximum effectiveness.

In a preferred embodiment, the combination is used with no spillage either during use of the mixing subassembly, or during beverage dispensing after completion of a mixing operation.

In a preferred embodiment, the pitcher preferably gradually and systematically increases in cross-sectional area proceeding upwardly from the closed bottom to the top or mouth, and the mixing subassembly has a mixing head whose sides and bottom are nestably received in adjacent relationship to the interior lowermost sides and bottom of the pitcher.

Although the inventive pitcher and mixing subassembly combination may be fabricated with the pitcher having a cross-sectionally circular configuration, it is preferred that the pitcher have in cross-section a race-track configuration.

The combination is easily assembled, used, and dissembled for cleaning or storage. The components of the combination can be easily fabricated from various materials, as the fabricator or user may desire. Preferably, the components are fabricated of molded plastic that is refrigerator storable, and that is cleanable at elevated water temperatures with detergents.

The mixing subassembly has a mixing head which is configured so that, upon reciprocal movement in the pitcher, the mixing head angularly deflects the liquid to produce the desired mixing action.

Other and further objects, aims, purposes, features, advantages, embodiments, applications, and the like will be apparent to those skilled in the art from the present specification disclosures taken with the accompanying drawings and the appended claims.

DETAILED DESCRIPTION

Referring to the drawings, a preferred embodiment 20 of a pitcher and mixing subassembly combination of this invention is shown. The combination 20 incorporates a pitcher 21 and a mixing subassembly 22 that is disassociatively associatable with the pitcher 21.

Although the pitcher 21 can have various configurations, the preferred configuration, as shown, has in cross-section a race-track configuration. Thus, pitcher 21 has (a) a pair of spaced, opposed, symmetrical, flattened side walls 23 and 24 with (b) a pair of spaced, opposed, symmetrical, semi-circular end walls 26 and 27. The side edge portions of each curved end wall 26 and 27 interconnect integrally with respective adjacent side edge portions of the side walls 23 and 24.

The pitcher 21 has a generally flattened bottom wall 28 that interconnects integrally with bottom side edges of the side walls 23 and 24 and the end walls 26 and 27, and an upper, upwardly opening, terminal open mouth 29 that is generally opposed to the bottom wall 28. Also, the pitcher 21 has a handle 31 that is integrally associated with one end wall 26 and a spout 32 that is integrally formed in the upper portion of the other end wall 27 adjacent mouth 29 as an end wall protrusion. Preferably, and as shown, the side walls 23 and 24 and the end walls 26 and 27 diverge slightly and continuously proceeding upwardly from bottom wall 28 to mouth 29.

Figure 1:
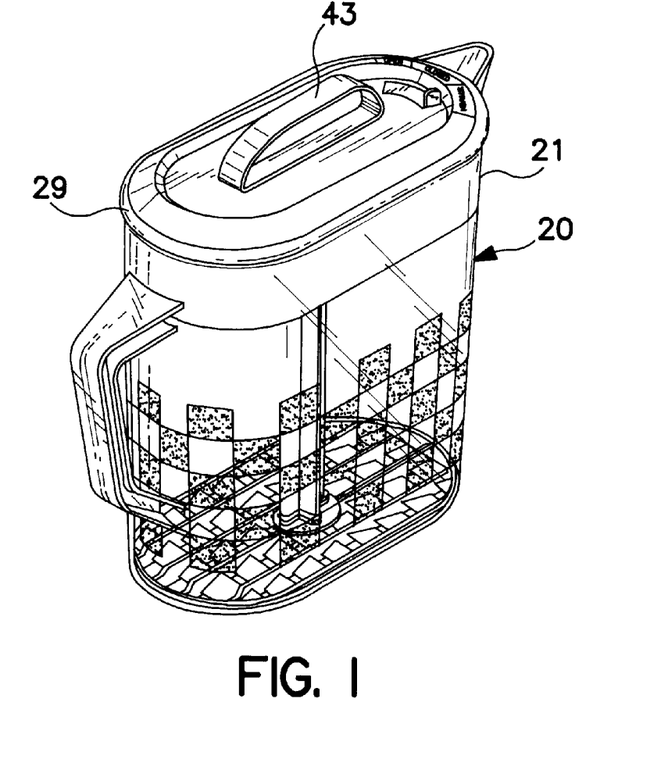
FIG. 1 is an assembled isometric view of a preferred embodiment of a pitcher and coacting mixing subassembly combination of the present invention.
Figure 2:
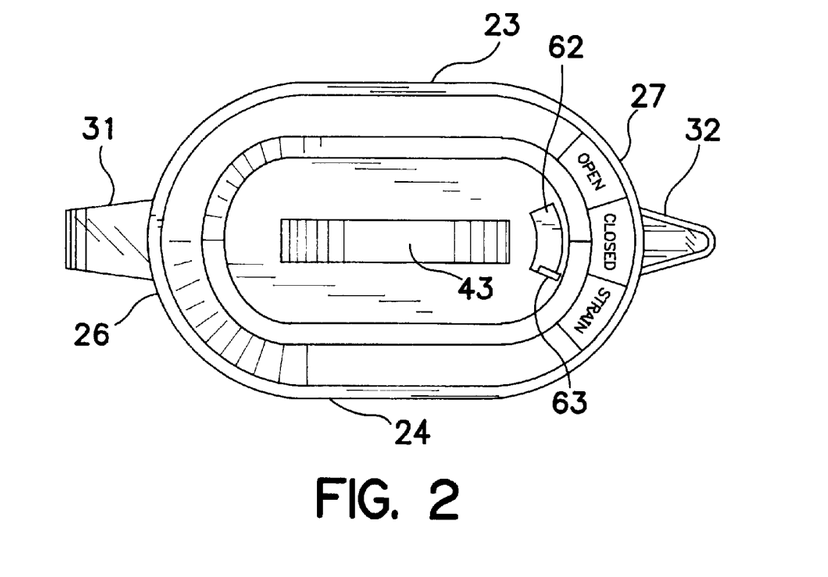
FIG. 2 is a top plan view of the FIG. 1 combination.
Figure 3:
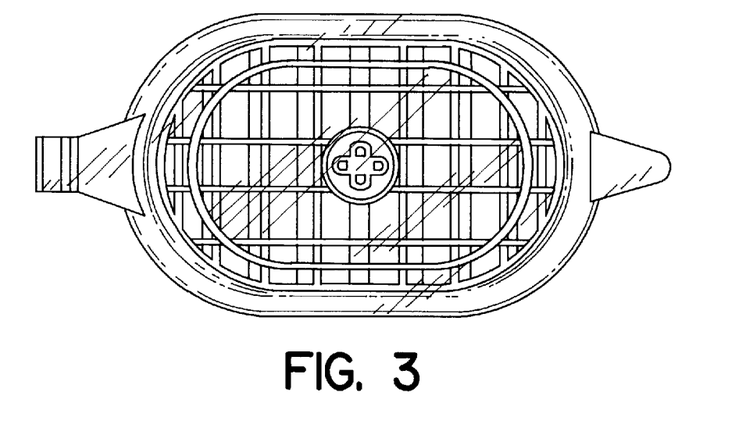
FIG. 3 is a bottom plan view of the FIG. 1 combination.
Figure 4:
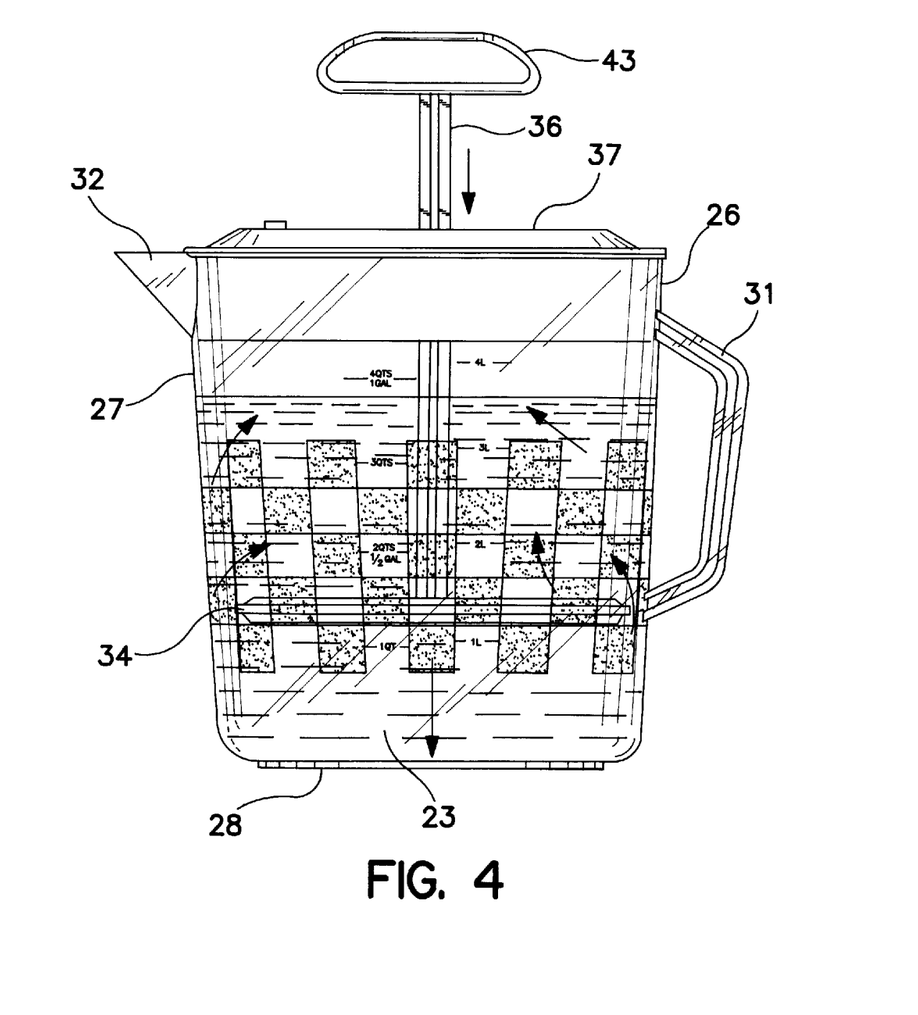
FIG. 4 is a side elevational view of the FIG. 1 combination, including for illustration purposes, decorative markings and indicia on the pitcher side wall, a liquid fill in the pitcher, and with the mixing subassembly moving downwardly, and with arrows illustrating downward movement of the mixing subassembly and concurrent liquid movement in the pitcher.
Figure 5:
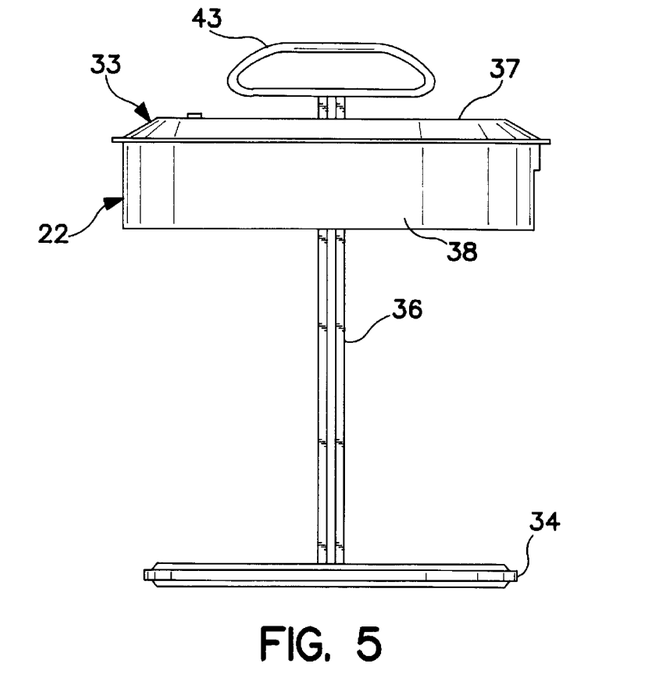
FIG. 5 is a side elevational view of the mixing subassembly apart from the pitcher.

The pitcher 21 can be comprised of various materials, but it is preferred to form the pitcher of a molded plastic, such as a transparent acrylic resin, or the like, with good high and low temperature stability characteristics and with good resistance to common acidic and alkaline substances, including detergents. Preferably the plastic used is slightly resilient and slightly elastomeric, thereby to enhance desirable use characteristics, as those skilled in the art will readily appreciate. The side and end walls can, if desired, have associated designs or measuring indicia, such as exemplified in FIG. 4.

The mixing subassembly 22 incorporates a lid 33, a mixing head 34, and a plunger rod or shaft 36.

The lid 33 can have various configurations, but is generally adapted to cover the mouth 29 and engage, preferably sealingly, mouth adjacent upper edge portions of the side and end walls 23, 24, 26 and 27 while permitting liquid in pitcher 21 to be dispensed from the spout 32 by tilting the pitcher 21 while holding the handle 31. In the combination 20, the lid structure 33 preferably comprises a mouth-closing cap portion 37 that has an integral downturned brim flange or skirt portion 38 that extends about the periphery of the cap portion 37. The skirt portion 38 is receivable through the mouth 29. The circumferentially extending outside surfaces of the skirt portion 38 are adapted to make contacting and sealing engagement with the radially adjacent circumferentially inside wall portions of the pitcher 21 adjacent the mouth 29 except in the region of the spout 32.

The lid structure 33 can be comprised of various materials, but it is presently preferred to mold the lid structure 33 as a single, unitary structure comprised of a durable plastic, such as, for example, a polyolefin resin, a polyacrylic resin, or the like. The plastic used can be opaque and pigmented, if desired. Preferably, the plastic used is slightly resilient, slightly elastomeric, and slightly waxy with regard to surface characteristics, thereby facilitating desirable use characteristics for the lid structure 33, as those skilled in the art will readily appreciate.

Figure 6:
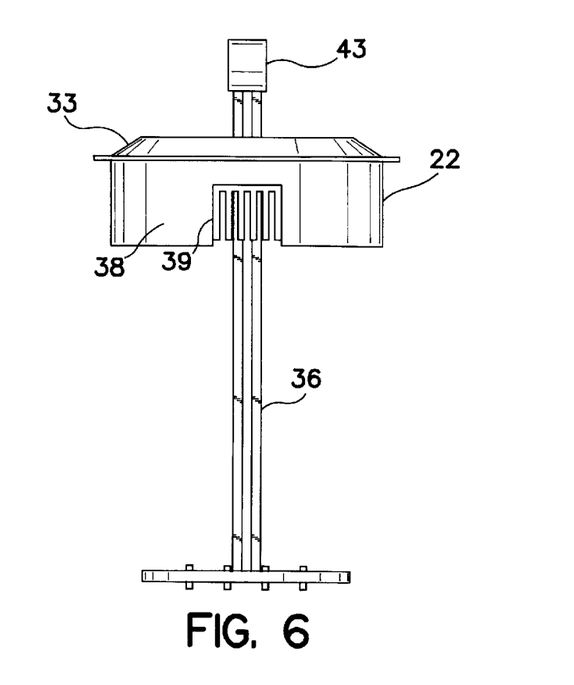
FIG. 6 is a front end elevational view of the mixing subassembly apart from the pitcher.
Figure 7:
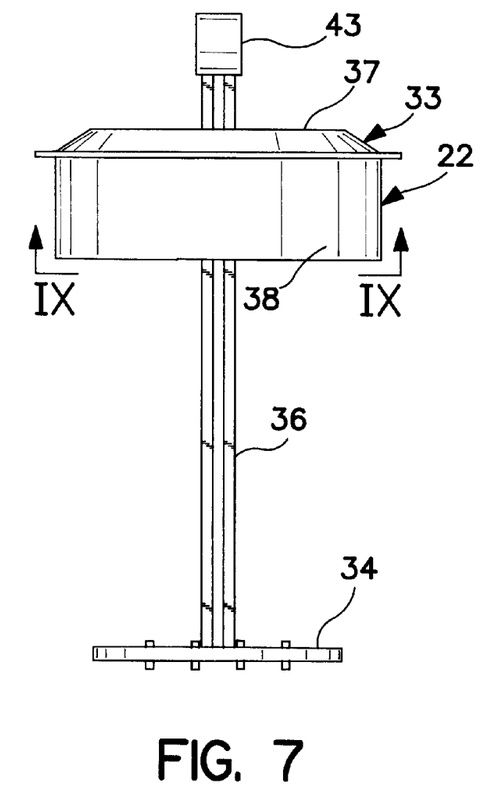
FIG. 7 is a back end elevational view of the mixing subassembly apart from the pitcher.
Figure 8:
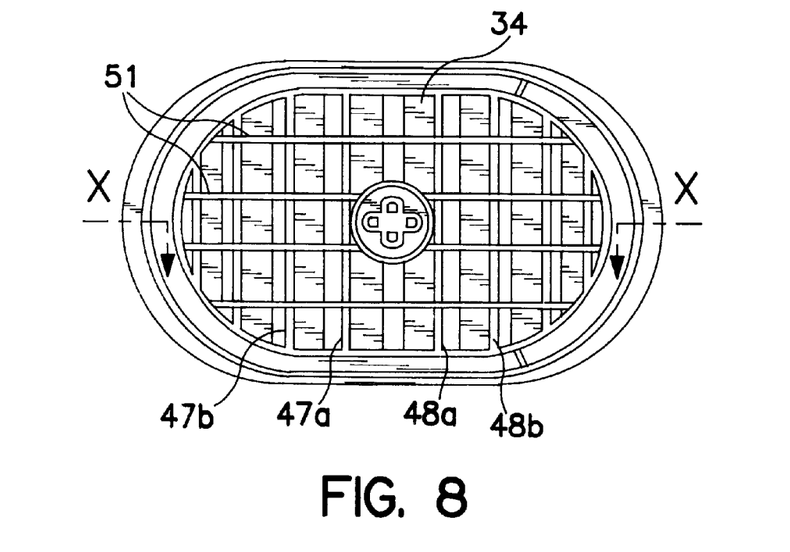
FIG. 8 is a bottom plan view of the mixing assembly in the configuration shown in FIG. 3, but with the pitcher bottom removed.

The skirt portion 38 is preferably provided with a window or aperture 39 (see FIG. 6, for example) that is positioned so that, when the lid structure 33 is engaged with the pitcher 21 and closes the mouth 29, the window 39 is aligned radially with the spout 32. Thus, when the lid structure 33 is so engaged with the pitcher 21, liquid can be dispensed from the assembled combination 20 through the spout 32 and aperture 39. As hereinafter explained, the lid structure 33 is preferably equipped with a closure means for reversibly closing the aperture 39, if desired.

The shaft 36 is elongated and preferably has a plus-sign configuration in transverse cross section. The shaft 36 slidably extends through an aperture 42 provided centrally in the cap portion 37. The aperture 42 has a plus-sign configuration which conforms to the exterior configuration of the shaft 36. Thus, when the shaft 36 extends slidably through the aperture 42, the shaft 36 is non-rotatable relative to the lid structure 33. The upper end of the shaft 36 is associated, preferably detachably, with a gripping member or portion 43. The lower end of the shaft 36 is associated with the central area 46 of the mixing head 34 so that the shaft 36 upstands from the central area 46 of the mixing head 34. Various alternative cross-sectional configurations for shaft 36 and for aperture 42 are possible, as exemplified in FIGS. 16–19.

The mixing head 34 has a peripheral frame portion 44 whose perimeter configuration permits the peripheral frame portion 44 to be nestably received in the pitcher 21 adjacent to the bottom wall 28 and adjacent to the lower side edges of the side walls 23 and 24 and the end walls 26 and 27.

The peripheral frame portion 44 is associated with first and second respective pluralities 47 and 48, respectively, of straight, diagonally extending, spaced, adjacent, parallel, generally flattened, generally elongated vanes. The vanes of each plurality 47 and 48 are mounted at each of their respective opposite vane ends to the peripheral frame portion 44 so that the vanes extend transversely across the peripheral frame portion 44. Each vane plurality 47 and 48 preferably has the same number of vanes. The vanes of the first plurality are located on one side of the central area 46, and the vanes of the second plurality are located on the opposite side of the central area 46. For convenient identification purposes (see FIG. 10), the individual vanes of the first plurality 47 are individually sequentially designated by progressive alphabetical letters proceeding outwards from the central area 46, and similarly for the vanes of the second plurality 48. Preferably all vanes in a mixing head 34 have similar widths and similar cross-sectional shapes. The vanes of the first plurality 47 also extend parallel to the vanes of the second plurality 48. Relative to the central area 46, the vanes of the first plurality 47 all have a first common fixed acute inclination angle, and the vanes of the second plurality 48 all have a second common fixed acute inclination angle. The first and the second inclination angles are equal but extend in opposite inclination relative to each other. While, as shown, each of the first and second vane pluralities 47 and 48 contains three or four vanes, the vane pluralities may each contain a larger or smaller number of vanes.

When the cap portion 37 of the lid structure 33 covers the mouth 29, and the skirt portion 38 is sealingly seated about the mouth 29 against the adjacent portions of the walls 23, 24, 26 and 27, and the mixing head 34 is reciprocated longitudinally, up and down in the pitcher 21 by an operator's hand upon the gripping portion 43, mixing occurs. During movement of the mixing head 34 in one direction in the pitcher 21, liquid in the pitcher 21 that moves through the mixing head 34 is angularly deflected by each of the first and the second vane pluralities 47 and 48 towards a midinterior region of the pitcher 21. In the combination 20, this liquid movement occurs when the shaft 36 is moving downwardly, owing to the manner in which the first and second inclination angles are set, and the mid-interior region is above the mixing head 34. During movement of the mixing head 34 in the opposite direction in the pitcher 21, liquid in the pitcher 21 that moves through the mixing head 34 is angularly deflected by each of the first and the second vane pluralities 47 and 48 towards opposed interior side regions in the pitcher 21. In the combination 20, this liquid movement occurs when the shaft 36 is moving upwardly, owing to the manner in which the first and second inclination angles are set, and the opposed interior side regions in the pitcher are below the mixing head 34.

Optionally, the respective first and second inclination angles can each be changed by 180 degrees, if desired, which results in a reversal of the liquid movement characteristics that occur during upward and downward movements of the shaft 36.

The mixing achieved by reciprocation of the mixing head 34 in the pitcher 21, as taught by this invention, regardless of which of the two types of inclination angles for vanes in the mixing head (and resulting associated fluid movement characteristics) are chosen, results in the accomplishing of mixing of liquid in the pitcher 21 in a rapid and efficient manner, even though the pitcher 21 does not have a cross-sectionally circular configuration.

Preferably, and as shown, the mixing head 34 is additionally provided with a plurality of straight, vertically oriented, generally flattened, generally elongated, spaced, parallel baffle plates 51. Preferably, all baffle plates in a mixing head 34 have similar widths and similar cross-sectional shapes. The baffle plates extend at an angle relative to the vanes, but preferably this angle is 90 degrees, so that, at the preferred angle, the baffle plates perpendicularly intersect the vanes. The baffle plates 51 are each mounted with their respective opposite ends secured to the peripheral frame portion 44. Also, the baffle plates 51 are fastened to the vanes at all locations of intersection therebetween. Preferably, a mixing head 34 is molded as a single integrated structure.

The baffle plates 51 provide various advantages. For one thing, they provide enhanced structural support for the vanes of each vane plurality 47 and 48. For another thing, they provide enhancing mixing action by the mixing head 34 by channeling of liquid flow through the region of the mixing head 34. For another thing, they enhance the capacity of the mixing head 34 to break apart solid and semi-solid masses that may happen to be present in the liquid being mixed. Examples of such masses include fruit pieces, such as pieces of citrus fruit or berries, and chunks of partially melted frozen juices, such as frozen fruit juices that are deposited into the pitcher and are to be melted and dissolved to form a uniform mixture of liquid in the pitcher 21.

Figure 10:
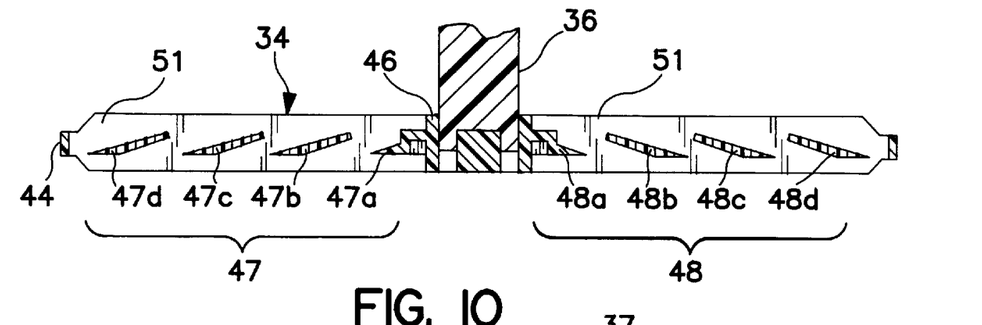
FIG. 10 is a vertical sectional view taken along the long axis X—X of FIG. 8 of the mixing head of the mixing subassembly with the shaft fragmentarily shown.

The baffle plates 51 in a mixing head 34 can have various widths. In one preferred embodiment, such as shown in FIG. 10, for example, the baffle plates have upper and lower respective edges that extend above and beyond, and below and beyond, respectively, corresponding adjacent respective upper and lower edges of the individual vanes which enhances channeling of fluid flow through a mixing head 34.

Figure 20:
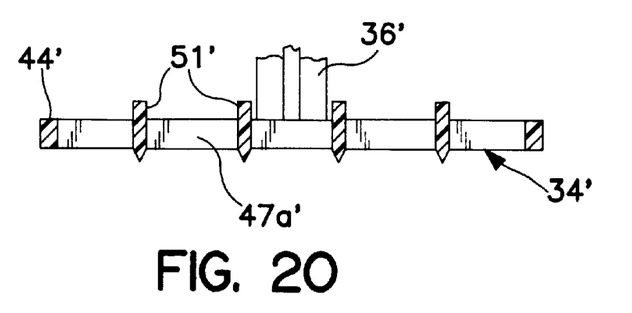
FIG. 20 is view similar to FIG. 10, but taken perpendicularly to the line X—X of FIG. 8 and showing an alternative embodiment for a mixing head.

In another embodiment of a mixing head 34', such as shown in FIG. 20, for example, the baffle plates 51' have lower edge portions which are tapered in a knife-like configuration which enhances break-up of solid and semi-solid bodies during operation of the mixing subassembly 22. Components of head 34' which respond to head 34 are similarly numbered but have prime marks added for identification purposes.

Figure 15:
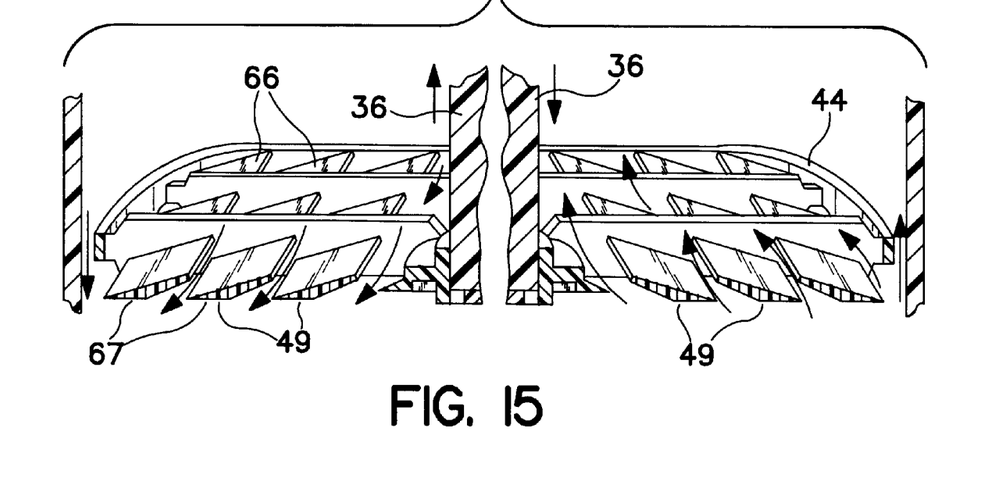
FIG. 15 is a perspective view of the mixing head of the mixing subassembly taken as shown in FIG. 10 but with the plate broken into two parts, the left hand part including arrows illustrating the flow of liquid through the mixing head when the shaft of the mixing subassembly is moving upwardly, and the right-hand part including arrows illustrating the flow of liquid through the mixing head when the shaft of the mixing assembly is moving downwardly.
Figure 16:
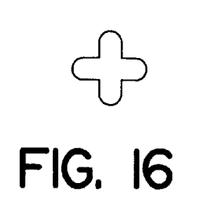
FIG. 16 is a transverse sectional view through a mid-region of the shaft of the mixing subassembly.
Figure 17:
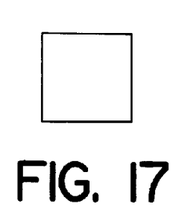
FIGS. 17, 18 and 19 are each similar to FIG. 16, but each showing a transverse sectional view of a different alternative embodiment of a shaft for a mixer subassembly.
Figure 18:
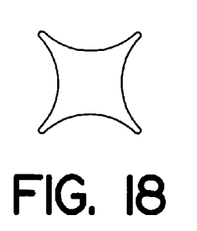
Figure 19:
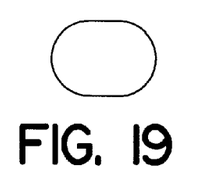

The mixing action provided by the vanes is enhanced by providing the vanes with one surface 66 which is smooth. Such a smooth surface is provided in embodiment 20 on the upper face of the individual vanes. The vanes are preferably medially and longitudinally thickened, and the opposing face 67 of the individual vanes is provided with a medial, longitudinally extending ridge 49 (see, for example, FIG. 15). Such a ridged surface is provided in embodiment 20 on the lower face 67 of the individual vanes.

Preferably, and as shown, the cross-section of the pitcher 21 and also of the mixing head 34 is characterized by having a long axis that extends between the curved end walls and a short axis that extends between the flattened side walls. Preferably, and as shown, the vanes of each vane plurality 47 and 48 extend parallel to the short axis while the baffle plates extend parallel to the long axis.

Figure 9:
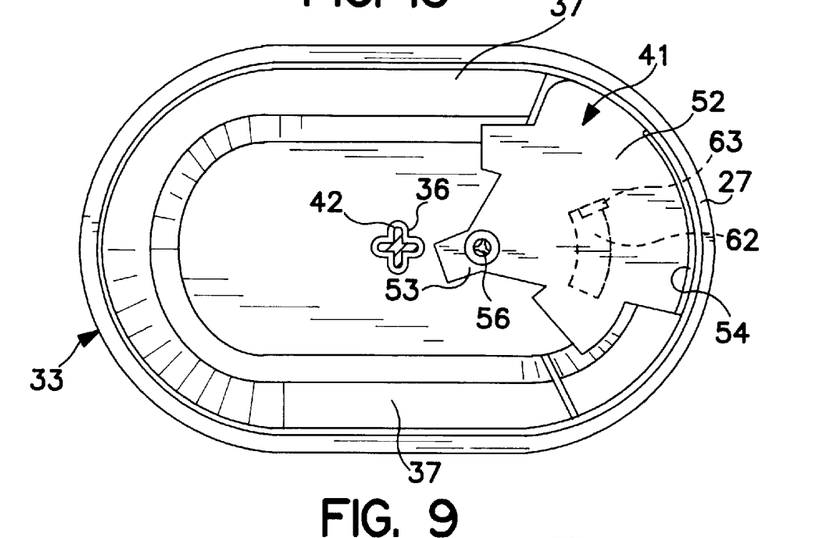
FIG. 9 is a bottom plan view of the pitcher lid apart from the pitcher and also from the mixing subassembly.
Figure 9A:
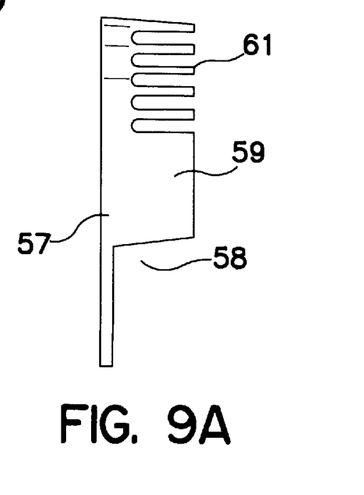
FIG. 9A is an elevational projection view showing the outside surface of the face of the curved flange of the leaf member, of the spout closure means.
Figure 11:
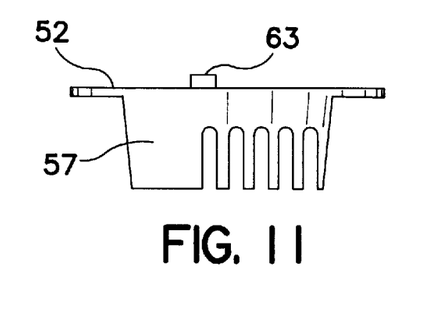
FIG. 11 is an enlarged front end elevational view of the sliding door of the pitcher lid apart from the pitcher lid.
Figure 12:
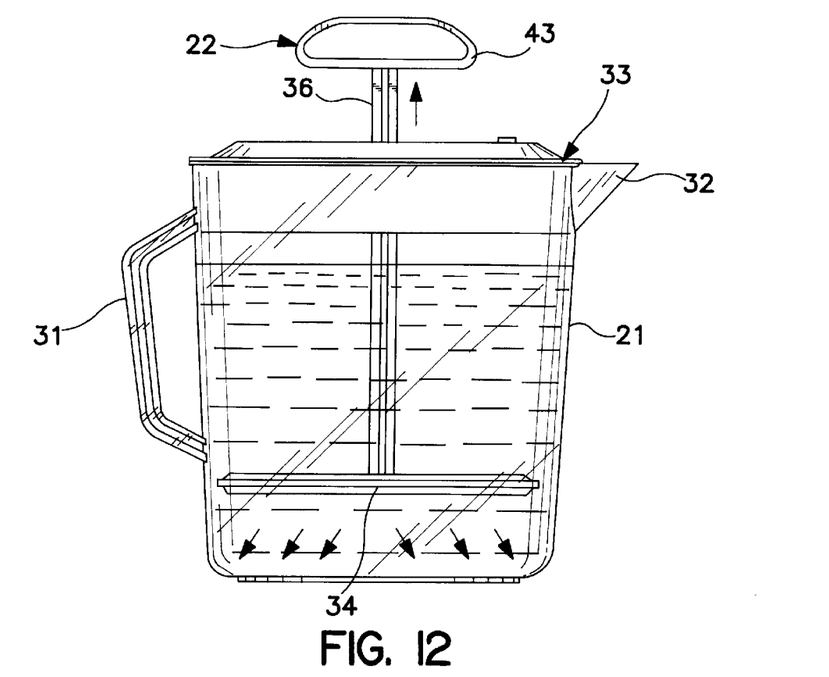
FIG. 12 is a side elevation view of the FIG. 1 combination showing the opposite side compared to FIG. 4, including for illustration purposes, a liquid fill in the pitcher, and with the mixing subassembly moving upwardly, and with arrows illustrating upward movement of the mixing subassembly and concurrent liquid movement in the pitcher.
Figure 13:
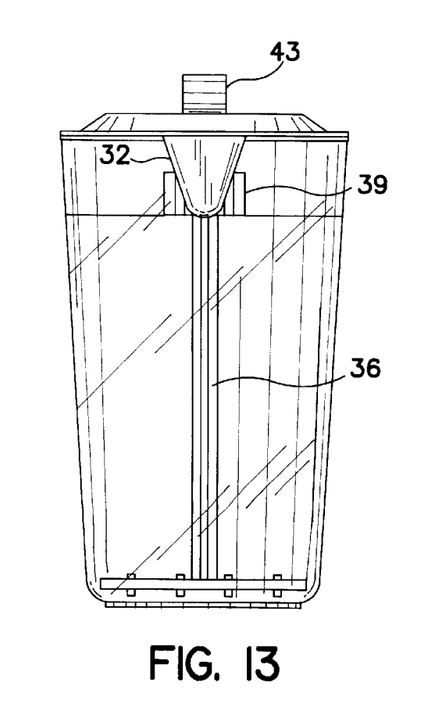
FIG. 13 is a front end elevational view of the FIG. 1 combination.
Figure 14:
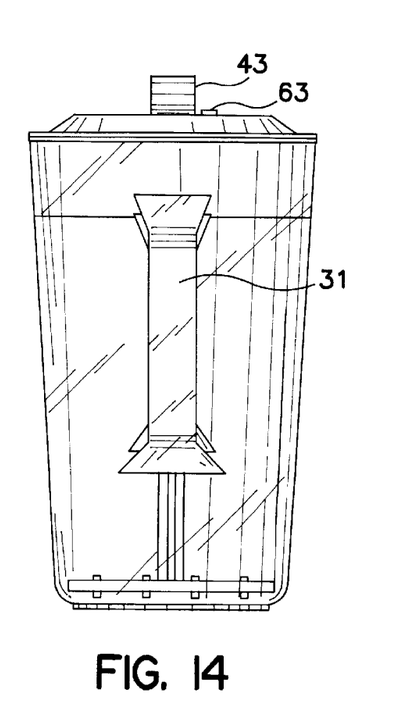
FIG. 14 is a back end elevational view of the FIG. 1 combination.

As above indicated, the lid structure 33 is preferably provided with a closure means for the window 39. A sliding gate structure 41 is provided (see FIGS. 9, 9A and 11) to achieve such a closure means. Thus, the lid structure 33 is provided on its interior or under side with a generally pie-configured, generally flattened leaf member 52 having an apex region 53 and a peripheral curvature along one side region 54 opposed to said apex region 53. The peripheral curvature of the region 54 generally conforms to the curvature of a pre-determined portion of a curved side region of the skirt portion 38 of the lid structure 33 that includes the spout 32. Here, the pre-determined curved portion lies along the curved wall 27. The leaf member 52 is adjacent to, and slidably movable over, a region of the cap portion 37 that is adjacent such pre-determined portion.

A pivot pin member 56 extends through both the apex region 53 of the leaf member 52 and an adjacent portion of the cap portion 37 whereby said leaf member 52 is pivotable relative to the cap portion 37.

An outstanding downturned flange 57 is integrally associated with, and extends perpendicularly along and from, the region 54. This flange 57 is adapted to move slidably over and adjacent to the window 39 when the leaf member 52 is so pivoted. The flange 57 (see FIG. 9A) has defined in a predetermined first portion thereof a second window 58, defined in a predetermined second portion thereof a continuous wall portion 59, and defined in a predetermined third portion thereof a plurality of spaced, parallel, comb-like fingers 61. Thus, when the flange slidably and progressively moves over and adjacent to the window 39 during pivotal movement of the leaf member 52, one of said first, second, and third portions (and, respectively, window 58, wall 59, and fingers 61) is locatable over the window 39.

An arcuate aperture 62 is defined in the cap portion 37 adjacent to the leaf member 52. A tab member 63 is provided that outstands from one face of the leaf member 52 and extends through the arcuate aperture 62. The curvature of the arcuate aperture 62 is matched to the path of travel of the tab member 63 during pivotal movements of the leaf member 52 about pin member 56.

Thus, manual movement of the tab member 63 results in the positioning of a predetermined one of said first, second and third portions over the window 39, thereby permitting, respectively, dispensing of liquid from window 39, closing of window 39, or straining of liquid before liquid dispensing from window 39.

It will be readily apparent from the foregoing detailed description of the invention and from the accompanying illustrations thereof that numerous variations and modifications may be effected without departing from the true spirit and scope of the novel concepts or principles of this invention.

What is claimed is:

1. A mixing pitcher comprising:
   (A) a pitcher having longitudinally uniform side walls, a closed bottom, an upwardly opening mouth opposed to said bottom, a spout adjacent said mouth, and a pitcher handle;
   (B) a mixing subassembly that is disassociatively associatable with said pitcher, said mixing subassembly comprising in combination:
      a lid structure sealingly engageable with said mouth, said lid structure comprising a cap portion having a central channel therethrough, and a peripheral, circumferentially extending, downturned, integrally formed skirt portion which is receivable through said mouth and whose circumferential outside terminal wall portions are adapted to make sealing engagement with radially adjacent circumferential inside wall portions of said pitcher that are longitudinally adjacent said mouth except in the region of said spout where a window in said skirt portion is defined;
      a shaft slidably extending through said central channel and having opposed upper and lower ends, said shaft including at its upper end a gripping portion, the interrelationship between said central channel and said shaft being such that said shaft is reciprocally movable longitudinally through said central channel, and
      a mixing head comprising
         a peripheral frame portion having a central area fixed to said lower shaft end with said shaft upstanding relative thereto,
         said peripheral frame portion being nestably receivable in said pitcher adjacent said side walls and said bottom, and
         said peripheral portion having first and second respective pluralities of straight, diagonally-extending, adjacent, parallel, generally flattened, generally elongated vanes, said vanes of each plurality being mounted across said peripheral portion, said first vane plurality being on one side of said central area, said second vane plurality being on the opposite side of said central area, all said vanes being parallel to each other, said vanes of said first plurality all having a first common, fixed, acute inclination angle relative to said peripheral frame portion, and said vanes of said second plurality all having a second common, fixed, acute inclination angle relative to said peripheral frame portion, and said first and said second inclination angles being equal but opposite in inclination relative to one another,
      whereby, when said lid structure is so sealingly engaged with said mouth, said mixing head is reciprocally moveable longitudinally in said pitcher by said gripping portion, so that, during movement of said mixing head in one direction, liquid in said pitcher that moves through said mixing head is angularly deflected by each of said first and said second pluralities of vanes towards a mid interior region of said pitcher, while during movement of said mixing head in the opposed direction, liquid in said pitcher that moves through said mixing head is angularly deflected by each of said first and said second pluralities of vanes towards opposed interior side regions of said pitcher, thereby producing mixing in said pitcher.

2. The mixing pitcher of claim 1 wherein said first and said second inclination angles are such that liquid in said pitcher is deflected towards said mid-region of said pitcher during downstroke movement of said mixing head.

3. The mixing pitcher of claim 1 wherein said first and said second inclination angles are such that liquid in said pitcher is deflected towards said mid-region of said pitcher during upstroke movement of said mixing head.

4. The mixing pitcher of claim 1 where, in said mixing head, a plurality of straight, vertically oriented, generally flattened, generally elongated, spaced, parallel baffle plates are mounted across said peripheral frame portion, extend angularly across said vanes, and are fastened to each of said vanes and to said peripheral portion at all locations of intersection therebetween.

5. The mixing pitcher of claim 4 wherein said baffle plates extend perpendicularly relative to said vanes.

6. The mixing pitcher of claim 4 wherein said pitcher has a cross-sectional race-track configuration.

7. The mixing pitcher of claim 6 wherein said pitcher and said peripheral frame portion of said mixing head each have opposed, semi-circular end walls and spaced, opposed, symmetrical, flattened side walls, and a long axis that extends between said end walls and a short axis that extends between said side walls.

8. The mixing pitcher of claim 7 wherein said vanes extend parallel to said short axis and said baffle plates extend parallel to said long axis.

9. The mixing pitcher of claim 1 wherein said central area of said peripheral frame portion is thickened and is supported by said vanes.

10. The mixing pitcher of claim 1 wherein said lid structure is additionally provided with a closure for said window in said skirt.

11. The mixing pitcher of claim 10 wherein said closure comprises (a) a generally pie-configured, generally flattened leaf member having an apex region and a peripheral curvature along one side region opposed to said apex region, said peripheral curvature generally conforming to the curvature of a pre-determined portion of a curved side region of said skirt portion of said lid structure, said leaf member being adjacent to, and slidably movable over, a region of said cap portion that is adjacent said pre-determined portion, (b) a pivot pin member extending through said apex region and an adjacent portion of said cap portion whereby said leaf member is pivotable relative to said cap portion, (c) an outstanding flange associated with, and extending perpendicularly along and from, said one said region, said flange being adapted to move slidably over said window when said leaf member is so pivoted, said flange having defined in a predetermined first portion thereof a second window, and defined in a predetermined second portion thereof a plurality of spaced, parallel comb-like fingers, and defined in a predetermined third portion thereof a continuous wall portion, whereby, as said flange slidably and progressively moves over said window during pivotal movement of said leaf member, one of said first, second, and third portions is locatable over said window, (d) an arcuate window defined in said cap portion adjacent to said leaf member, and (e) a tab member outstanding from said leaf member and extending through said arcuate window, the curvature of said arcuate window being matched to the path of travel of said tab member during pivotal movements of said leaf member, whereby manual movement of said tab member permits positioning of a predetermined one of said first, second and third portions over said window.

12. The mixing pitcher of claim 1 where, in said mixing head, each of said vanes is characterized by having upper and generally opposed lower respective side surface portions, and a medial thickening longitudinally therebetween, and by having a medial, longitudinally extending ridge extending on said lower side surface portion.

13. The mixing pitcher of claim 12 where, in said mixing head, a plurality of vertically oriented, generally flattened, generally elongated, spaced, parallel baffle plates are mounted across said peripheral frame portion, and extend angularly relative to said vanes, and are fastened to each of said vanes and to said peripheral frame portion at all locations of intersection therebetween.

14. The mixing pitcher of claim 13 where, in said mixing head, said baffle plates have upper and lower respective edges that extend above and below corresponding respective upper and lower respective edges of said vanes.

15. The mixing pitcher of claim 13 where, in said mixing head, said vanes have upper and lower respective edges that extend above and below corresponding respective upper and lower respective edges of said baffle plates.

16. The mixing pitcher of claim 1 wherein said pitcher gradually and systematically increases in cross-sectional area proceeding upwardly from said closed bottom to said mouth.

17. A mixing pitcher comprising:
a pitcher having side walls, a closed bottom, and an upwardly opening mouth; and
a mixing subassembly including:
a lid, engageable with the mouth, having a central channel therethrough;
a shaft extending through the central channel and reciprocally movable longitudinally relative to the lid; and
a mixing head fixed to the shaft and receivable in the pitcher adjacent the side walls and movable between proximate the mouth and proximate the bottom and including a first plurality of vanes on one side of the shaft and a second plurality of vanes on an opposite side of the shaft, the vanes of the first plurality being inclined at a first angle relative to the shaft, and the vanes of the second plurality being inclined at a second angle relative to the shaft, the first and second angles being opposite in inclination;
such that during movement of the mixing head in the pitcher in one direction, liquid in the pitcher that moves through the mixing head is angularly deflected by the first and the second pluralities of vanes toward a middle region of the pitcher, while during movement of the mixing head in the pitcher in an opposite direction, liquid in the pitcher that moves through the mixing head is angularly deflected by the first and the second pluralities of vanes towards opposed side regions of the pitcher, thereby producing mixing in the pitcher.

18. The mixing pitcher of claim 17 wherein the first and the second inclination angles are such that liquid in the pitcher is deflected towards the mid-region of the pitcher during downstroke movement of the mixing head.

19. The mixing pitcher of claim 17 wherein the first and the second inclination angles are such that liquid in the pitcher is deflected towards the mid-region of the pitcher during upstroke movement of the mixing head.

20. The mixing pitcher of claim 17 wherein the mixing head includes a plurality of spaced, parallel baffle plates that extend angularly across the vanes and are fastened to the vanes.

21. The mixing pitcher of claim 20 wherein the baffle plates extend perpendicularly relative to the vanes.

22. The mixing pitcher of claim 20 wherein the pitcher has a cross-sectional race-track configuration.

23. The mixing pitcher of claim 22 wherein the mixing head has a peripheral portion, and the pitcher and the peripheral portion of the mixing head each have a long axis that extends between opposed, semi-circular end walls and a short axis that extends between spaced, opposed, symmetrical, flattened side walls.

24. The mixing pitcher of claim 23 wherein the vanes extend parallel to the short axis and the baffle plates extend parallel to the long axis.

25. The mixing pitcher of claim 23 where, in the mixing head, a plurality of vertically oriented, generally flattened, generally elongated, spaced, parallel baffle plates are mounted across the peripheral portion, and extend angularly relative to the vanes, and are fastened to each of the vanes and to the peripheral portion at all locations of intersection therebetween.

26. The mixing pitcher of claim 25 where, in the mixing head, the baffle plates have upper and lower respective edges that extend above and below corresponding respective upper and lower respective edges of the vanes.

27. The mixing pitcher of claim 25 where, in the mixing head, the vanes have upper and lower respective edges that extend above and below corresponding respective upper and lower respective edges of the baffle plates.

28. The mixing pitcher of claim 17 wherein the central area of the mixing head is thickened and is supported by the vanes.

29. The mixing pitcher of claim 17 where, in the mixing head, each of the vanes is characterized by having upper and generally opposed lower respective side surface portions, and a medial thickening longitudinally therebetween, and by having a medial, longitudinally extending ridge extending on the lower side surface portion.

30. The mixing pitcher of claim 17 wherein the pitcher gradually and systematically increases in cross-sectional area proceeding upwardly from the closed bottom to the mouth.

31. The mixing pitcher of claim 17 wherein the lid includes a cap portion, a skirt having a window, and a closure for the window in the skirt, the closure comprising (a) a generally pie-configured, generally flattened leaf member having an apex region and a peripheral curvature along one side region opposed to the apex region, the peripheral curvature generally conforming to the curvature of a pre-determined portion of a curved side region of the skirt of the lid structure, the leaf member being adjacent to, and slidably movable over, a region of the cap portion that is adjacent the pre-determined portion, (b) a pivot pin member extending through the apex region and an adjacent portion of the cap portion whereby the leaf member is pivotable relative to the cap portion, (c) an outstanding flange associated with, and extending perpendicularly along and from, the one the region, the flange being adapted to move slidably over the window when the leaf member is so pivoted, the flange having defined in a predetermined first portion thereof a second window, and defined in a predetermined second portion thereof a plurality of spaced, parallel comb-like fingers, and defined in a predetermined third portion thereof a continuous wall portion, whereby, as the flange slidably and progressively moves over the window during pivotal movement of the leaf member, one of the first, second, and third portions is locatable over the window, (d) an arcuate window defined in the cap portion adjacent to the leaf member, and (e) a tab member outstanding from the leaf member and extending through the arcuate window, the curvature of the arcuate window being matched to the path of travel of the tab member during pivotal movements of the leaf member, whereby manual movement of the tab member permits positioning of a predetermined one of the first, second and third portions over the window.

* * * * *